(12) United States Patent
Maillot

(10) Patent No.: US 6,745,330 B1
(45) Date of Patent: Jun. 1, 2004

(54) COMPUTER SYSTEM HAVING PERIPHERAL DEVICE LOOK

(75) Inventor: Patrick Maillot, Bresson (FR)

(73) Assignee: Hewlett-Packard Company, L.P., Houston, TX (US)

( * ) Notice: Subject to any disclaimer, the term of this patent is extended or adjusted under 35 U.S.C. 154(b) by 0 days.

(21) Appl. No.: 09/420,195

(22) Filed: Oct. 18, 1999

(30) Foreign Application Priority Data

Jun. 22, 1999 (EP) .............................. 99410082

(51) Int. Cl.⁷ .................. G06F 11/00; E05B 67/00; G05B 11/01
(52) U.S. Cl. ................. 713/200; 713/100; 700/9; 700/11; 70/51
(58) Field of Search .................. 713/201, 184, 713/200, 100, 1; 70/51; 700/9, 11, 17, 22

(56) References Cited

U.S. PATENT DOCUMENTS 4,669,281 A 6/1987 Young .................. 70/57
5,277,599 A 1/1994 Nilson .................. 439/133

FOREIGN PATENT DOCUMENTS

| EP | 0 681I 244 | 11/1995 |
|---|---|---|
| WO | WO 93/01540 | 1/1993 |
| WO | WO 97/37293 | 10/1997 |
| WO | WO 98/21640 | 5/1998 |

Primary Examiner—Norman M. Wright

(57) ABSTRACT

To provide a more manageable security system for protecting cable-connected peripheral devices, a computer system is described having a removable peripheral device that is connectable to the computer system via a flying lead and a plug and socket combination, characterized by a lock member that is movable under the control of software running on the computer system to release or secure the plug to the socket.

8 Claims, 3 Drawing Sheets

COMPUTER SYSTEM HAVING PERIPHERAL DEVICE LOOK

FIELD OF THE INVENTION

The present invention relates to security in computer systems and, more particularly, to the physical security of peripheral devices attached to computer systems.

BACKGROUND OF THE INVENTION

Computer systems and peripheral devices used therewith have become very small, compact and easy to move. Whilst this has many advantages it has also created some problems. One problem associated with compact and lightweight computer equipment is that it is more easily stolen.

Certain computer system configurations lend themselves well to the provision of a locking system to prevent unauthorised removal of certain system components. For instance, various ways are known of locking portable computers to their associated docking stations—see for instance WO93/1540 and EP 0681244.

Also known is the automatic engagement and disengagement of devices, such as storage subsystems, that are removably mountable in a device bay of a computer system. Examples of these kinds of device ejection systems can be found in WO98/21640 and WO97/37293.

However, peripheral devices that are attached to a system unit by flying leads represent a particularly vulnerable part of a computer system and one that is not addressed by the presently available range of security measures. Such devices can include not only low value system components such as keyboards and mice, but also higher value peripheral devices such as external storage drives, smart card readers, printers, display devices and even digital cameras and telephones.

Recent developments in 'plug and play' type bus systems, in which devices can be dynamically connected and disconnected without the bus system having to be restarted, has meant that it can be expected that a wider variety of pluggable and unpluggable devices will become available and that such devices will become more mobile within the computing environment as a whole. Such developments only increase the need for security measures to be provided to prevent unauthorised removal of such devices.

This problem is at least partially addressed by cable lock systems, such as those described in U.S. Pat. No. 4,669,281 and U.S. Pat. No. 5,277,599, that are operable using a key.

One of the main advantages of using key operated locks is that they can be unlocked even if there is no power on. However, anyone wishing to remove a peripheral device must be physically in possession of one of the keys. It is not possible to provide for software control of the lock to enable desirable functionality such as remote locking and unlocking, password controlled access, or proper data or time synchronisation between the peripheral device and the computer system.

Such features are particularly desirable for organisations that own and manage very many PCs, and therefore that need to manage access to hardware more easily. If hardware changes are desired in many machines at the same time, the system manager can access systems without having to locate keys and can unlock machines over a computer network, using appropriate hardware management software tools like ones included in the HP Toptools package, available from Hewlett-Packard Company.

This invention is directed to overcoming the drawbacks of the prior art, in particular by providing a more manageable security system for protecting cable-connected peripheral devices.

SUMMARY OF THE INVENTION

In brief, this is acheived by a computer system having a removable peripheral device that is connectable to the computer system via a flying lead and a plug and socket combination, characterised by a lock member that is movable under the control of software running on the computer system to release or secure the plug to the socket.

In a preferred embodiment, resilient biasing means bias the lock member into a lock position in which the plug cannot be removed from the socket and an actuator is provided that is responsive to an electrical signal to urge the lock member to a unlock position in which the plug can be removed from the socket. Suitably, the actuator can comprise a length of shape memory wire arranged to move the lock member.

In one implementation, the peripheral device is connected to the computer system via a Universal Serial Bus and the plug is a USB standard plug.

Viewed from other aspects, the invention provides a computer unit for use in the above described system, the unit comprising a socket for receiving a plug, the socket having a movable lock member and means to enable software to move the lock member from a locked state to an unlocked state and a computer program for use in such a system and stored on a computer readable media, the program comprising code portions for causing a computer to generate a signal to lock or unlock a peripheral device attached to the system by a flying lead and a plug and socket combination.

BRIEF DESCRIPTION OF THE DRAWINGS

A locking peripheral device connector embodying the invention will now be described, by way of non-limiting example, with reference to the accompanying diagrammatic drawings, in which.

BEST MODE OF CARRYING OUT THE INVENTION

The Universal Serial Bus (USB) is a new high speed bus standard used for attaching peripheral devices to computer systems and that supports data transfer rates of 12 million bytes per second. A single USB port can be used to connect up to 127 peripheral devices, such as mice, modems, keyboards and other devices. USB also supports plug and play installation and hot plugging.

Figure 1A:
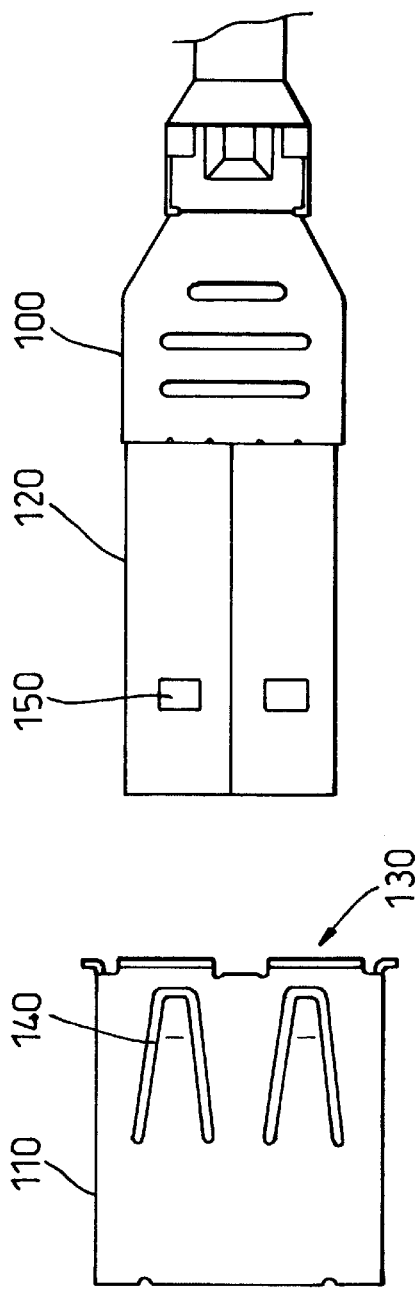
FIGS. 1A&B shows a conventional USB plug and socket in plan view and side view.
Figure 1B:
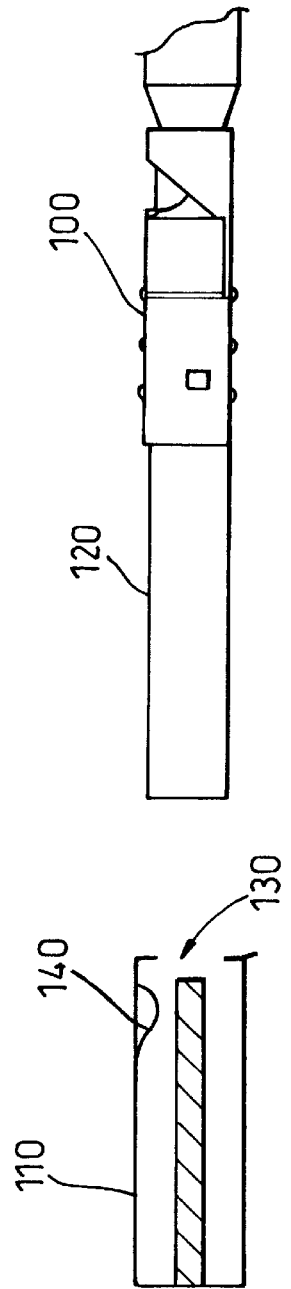

FIG. 1 shows a conventional USB series 'A' plug 100 and socket 110, the precise mechanical dimensions of which are defined in the Universal Serial Bus Specification revision 1.1 developed by Compaq, Intel, Microsoft and NEC and available from those companies.

Plug 100 includes a shielding member 120 which mates with an opening 130 in the corresponding socket. Plug 100 is normally releasably held in place by small finger-like springs 140 on top of the socket. These springs engage openings 150 on the top surface of shield member 120 and give positive feedback to the user when the plug is inserted in the socket as well as providing a low level of resistance against the plug being accidentally removed from the socket.

Figure 2A:
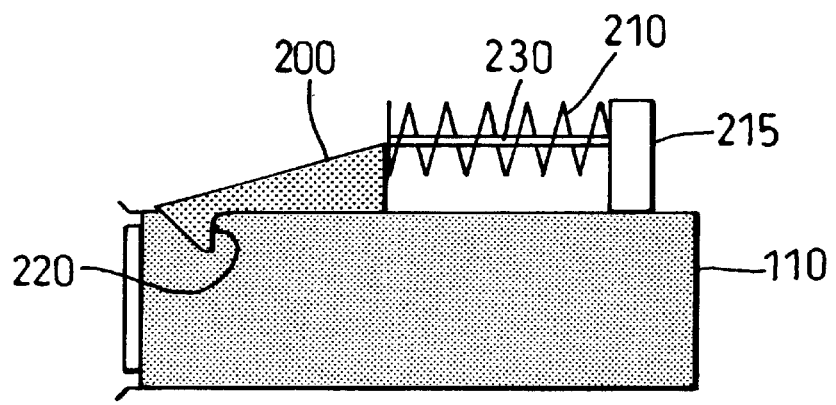
FIGS. 2(A&B) shows a USB socket including a lock mechanism.
Figure 2B:
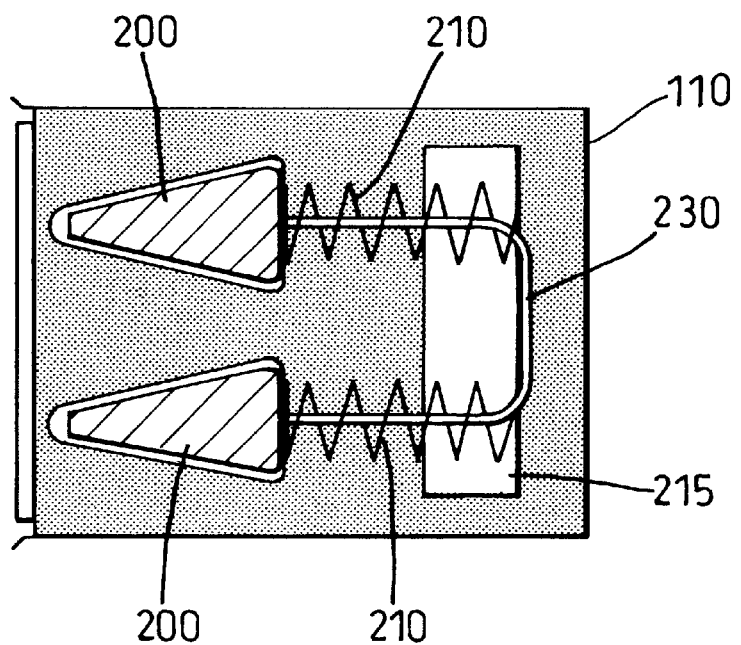

FIG. 2 shows a modified USB socket which includes hinged lock members 200 that are movable under the control of software running on the computer system to release or secure the plug to the socket. Hinged lock members 200 are supported on casing 110 and are biased into a lock position by coil springs 210, which abut a back support 215.

The metal used for the hinges is taken from the socket encasing and can be modified into a hinge. Another area of the socket top casing is used to create back support 215 by cutting and bending the metal into a rigid, vertical plate.

Figure 3B:
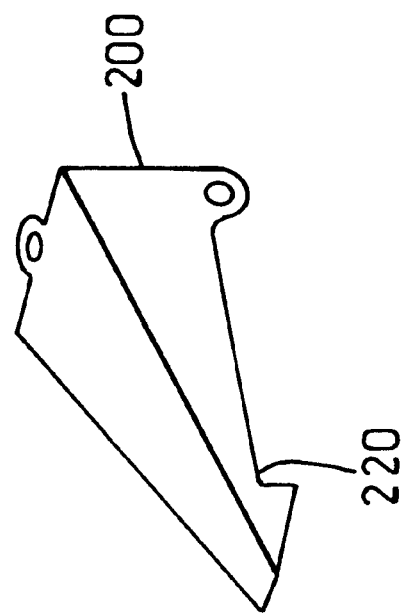
FIGS. 3(A&B) shows a lock piece assembly from the lock mechanism of FIG. 2.
Figure 3A:
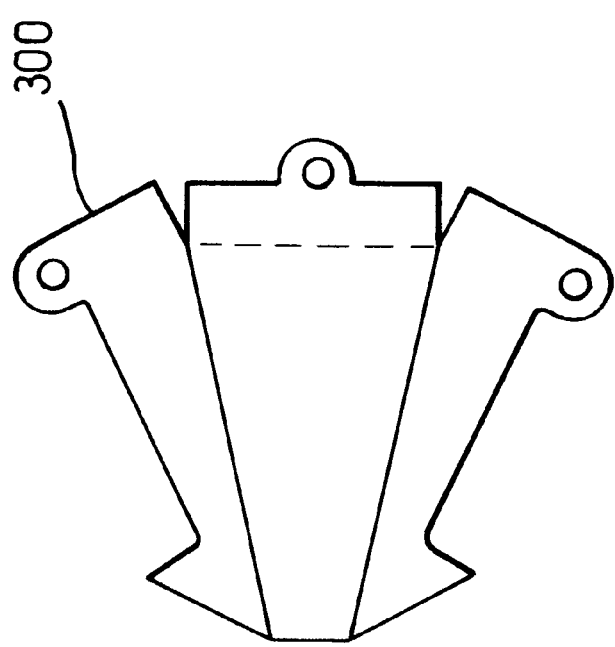

An additional sheet metal part is used to create lock member 200. This part is shown in FIG. 3. Simply created out of sheet metal, the form 300 is cut and folded into shape and attached to the hinges on top of the socket.

Spring 210 acts on lock member 200 such that when the plug is inserted, the lock will audibly "click" so the user knows the plug is correctly engaged in the socket. Lock members 200 each include a hook portion 220 that engages openings 150 and securely holds the plug, without the possibility of manual removal.

The release mechanism is actuated by a length of shape memory wire 230, which has the specific capability to retract when an electric current is passed through it—thereby generating heat. Wire 230 is attached to the two lock members 200 positioned on top of the socket and passes through the springs, through two holes punched in the back support and behind back support 215. A Teflon-like coating on wire 230 protects the shape memory wire and prevents short circuits with the socket. Applying a current between points at each end of the wire for a specific time will pull on the lock pieces and release plug 100.

Actuation of the wire can be a controlled by a specific driver and/or by a software application which enables a suitable electrical output on the motherboard, such as a general purpose output (GPO) provided by the core-logic chipset components. It will be appreciated that a wide variety of such software control arrangements are possible—this being one of the advantages of the invention—and their detailed implementation, being well known to those skilled in the art, need not be described here.

Since the release of the plug is controlled by software that runs locally on the system, it is possible to control release of the plug access using the same mechanisms that are used to authorise access to the system. Additional possibilities include remote controlling the release sequence in a network-managed environment and possible bypass when the computer system chassis is opened. It is also possible to add simple visual devices (such as LED's) to indicate when it is safe or authorized to remove the USB plug from its socket.

It will be noted that in the above arrangement, no modification is required to the USB plug 100. This is of practical importance because numerous devices with this connector have already been sold on the market and it would be undesirable to require modification of such existing devices. The only changes needed affect the USB socket. Such sockets are typically soldered on to a circuit board, such as the motherboard of a computer.

This mechanism of this embodiment provides a secure way to mechanically secure a USB plug into a socket, but the approach can equally be applied to other types of connectors. Similarly, other types of actuators, such as electromechanical actuators, can be used to effect the unlocking action and many other forms of the lock member are possible.

Moreover, whilst in this embodiment the lock member is mounted within a socket itself mounted on the computer system, it is possible that in other implementations a lock member could be associated with the plug attached to the peripheral device and actuated, for instance, via communication across the bus itself.

It will be understood that the terms plug and socket are used throughout this specification to designate two mating or interlocking parts. They are not intended to carry any implication as to the detailed configuration of such parts and in particular they are not intended to designate whether either part is male or female. The invention is unrelated to the way the electrical contacts of the plug and socket are put into contact or to mechanical aspects of the plug/socket configuration other than the locking mechanism.

Consequently, although a specific embodiment of the invention has been described, the invention is not to be limited to the specific arrangement so described. The invention is limited only by the claims. The claims themselves are intended to indicate the periphery of the claimed invention and are intended to be interpreted as broadly as the language itself allows, rather than being interpreted as claiming only the exemplary embodiment disclosed by the specification.

What is claimed is:

1. A computer system comprising:
   at least a first housing portion;
   a removable peripheral device that is electrically connectable to the housing portion via a flying lead and a plug and socket combination; and
   a lock member that is movable under the control of software running on the computer system to release or secure the plug to the socket.

2. A computer system as claimed in claim 1 comprising resilient biasing means for biasing the lock member into a lock position in which the plug cannot be removed from the socket and an actuator responsive to an electrical signal to urge the lock member to a unlock position in which the plug can be removed from the socket.

3. A computer system as claimed in claim 1 wherein the housing portion comprises a socket for receiving a plug, the lock member being mounted within the socket.

4. A computer system as claimed in claim 1 comprising a length of shape memory wire arranged to move the lock member.

5. A computer system as claimed in claim 1 wherein the lock member is pivotally mounted on a support.

6. A computer system as claimed in claim 5 wherein the peripheral device is connected to the computer system via a Universal Serial Bus and the plug is a USB standard plug.

7. A computer unit for use in a system as claimed in claim 1, the unit comprising a socket for receiving a plug, the socket having a lock member arranged to be movable under software control from a locked state to an unlocked state.

8. A computer program for use in a computer system as claimed in claim 1 and stored on a computer readable media, the program comprising code portions for causing a computer to generate a signal to lock or unlock a peripheral device attached to the system by a flying lead and a plug and socket combination.

* * * * *